(12) United States Patent
Lou et al.

(10) Patent No.: US 6,214,296 B1
(45) Date of Patent: Apr. 10, 2001

(54) METHOD OF CATALYTIC REACTION CARRIED OUT NEAR THE OPTIMAL TEMPERATURE AND AN APPARATUS FOR THE METHOD

(76) Inventors: Shoulin Lou; Ren Lou, both of 8-1-201 Dongxin Qiao Zhejiang University of Technology, Zhaohui, Xincun, Hangzhou, 310014, Zhejiang Province (CN)

( * ) Notice: Subject to any disclaimer, the term of this patent is extended or adjusted under 35 U.S.C. 154(b) by 0 days.

(21) Appl. No.: 09/242,574

(22) PCT Filed: Aug. 20, 1997

(86) PCT No.: PCT/CN97/00082

§ 371 Date: Feb. 18, 1999

§ 102(e) Date: Feb. 18, 1999

(87) PCT Pub. No.: WO98/07510

PCT Pub. Date: Feb. 26, 1998

(30) Foreign Application Priority Data

Aug. 21, 1996 (CN) .................................................. 96111851

(51) Int. Cl.⁷ .................................. C01C 1/04; B01J 8/02; B01J 8/04
(52) U.S. Cl. .......................... 422/148; 422/189; 422/190; 422/191; 422/192; 422/193; 422/208; 422/211; 422/218

(58) Field of Search ...................................... 422/148, 188, 422/189, 190, 191, 192, 193, 198, 200, 201, 202, 208, 211, 218, 222, 236, 239

(56) References Cited

U.S. PATENT DOCUMENTS 3,663,179 * 5/1972 Mehta et al. ........................... 23/289
5,190,731 * 3/1993 Stahl ...................................... 422/148

FOREIGN PATENT DOCUMENTS 2067184U   12/1990   (CN) .
1104126    6/1993    (CN) .
1088476    6/1994    (CN) .

\* cited by examiner

Primary Examiner—Shrive Beck
Assistant Examiner—Frederick Varcoe
(74) Attorney, Agent, or Firm—Merchant & Gould (57) ABSTRACT

The present invention discloses a method of catalytic reaction operated near the optimal temperature and an apparatus for its embodiment. The catalyst bed in the apparatus consists of two parts of catalyst located respectively in the cold tube layer and the adiabatic layer. The feed gas in the cold tubes, after having exchanged heat with the reactant gases in the catalyst layer outside of the tubes, are mixed with the feed gas from the heat exchanger. While the mixed gases flow axially, radially or convectively in the catalyst layer, the gases contact successively with the catalyst in the cold tube layer and that in the adiabatic layer, and react with each other.

8 Claims, 8 Drawing Sheets

METHOD OF CATALYTIC REACTION CARRIED OUT NEAR THE OPTIMAL TEMPERATURE AND AN APPARATUS FOR THE METHOD

TECHNICAL FIELD

The present invention relates to a gas-solid phase catalytic reaction process and the apparatus for the embodiment of the method. Said process is useful for gas-solid phase catalytic reactions and heat transfer in the field of chemical engineering, in particular for the synthetic reaction of ammonia, as well as the synthesis of methanol, methane and methyl ether.

BACKGROUND OF THE INVENTION

In gas-solid phase exothermic catalytic reactions such as the synthesis of ammonia from hydrogen and nitrogen under pressure, there exists an optimal temperature for fixed pressure and fixed composition of reactant gases, under which temperature the reaction rate is the highest. This optimal temperature, however, decreases as the synthesis rate increases, and with the proceeding of the reaction, the temperature of the catalyst layer will be raised by the continuous releasing of the reaction heat. Thus, in order to improve the efficiency of the reactor, it is necessary to remove the reaction heat out of the reactor. One method that has been widely used is the multi-stage feed-gas-quench reactor, such as the Kellogg four-stage catalyst beds used in large scale ammonia plants. In such systems, feed-gas-quench is used between the stages to reduce the reaction temperature. But as the temperature of the reactant gases is reduced by feed-gas-quench, the concentration of the product of reaction is reduced at the same time, so the synthesis rate is also affected. Improved forms have appeared, in the better ones, the catalyst is divided into three beds. While feed-gas-quench is used between the first and the second section, indirect heat exchange is used between the second and the third section, see, for example, the Chinese patent application CN1030878 filed by the Casale Co. and published on Feb. 8, 1989. The affect on the concentration of the product of reaction by feed-gas-quench has not been completely overcome in this kind of reactors, and the structure of the equipment is made complicated by the adding of indirect heat exchangers between the layer beds.

SUMMARY OF THE INVENTION

The object of the present invention is, in accordance with the characteristics of the gas-solid phase catalytic exothermic reversible reactions, to provide an improved reactor that can overcome the disadvantages of the prior art and a method in which the reaction is operated under the optimal temperature. The technical features of the reactor are reasonable temperature distribution in the bed layers, high activity of the catalyst, simple and reliable structure, and good operating performance.

The reversible gas-solid catalytic exothermic reaction and the releasing of heat mainly occur at the initial stages of the reaction process. The purpose of the present invention is fulfilled by the following improvements. Firstly, the feed gas is divided into two streams, streams 1 and 2, to be warmed respectively. Stream 1 is warmed by exchanging heat with the reaction gases exiting from the catalyst bed, and stream 2 flows in the cold tubes in the upper part of the catalyst layer and is warmed by exchanging heat with the counter-flowing reactant gases outside of the tubes. The flow rate and temperature of stream 2 in the cold tubes can be adjusted in accordance with the temperature of the catalyst layer. Secondly, the warmed streams 1 and 2 are combined together, react in the cold tube catalyst layer and exchange heat with the feed gas in the cold tubes, and then the reactant gases enter the lower part of the catalyst layer and react adiabatically. Thus, in the initial stage of the reaction, heat exchange is effected by counter-flow cold tubes, the reaction can start at an approximately adiabatic condition, so that the optimal temperature can be reached more quickly. As the heat exchange with the counter-flow cold tubes proceeds, the temperature difference between the interior and exterior of the tubes increases with the depth in the catalyst layer, so that the temperature of the catalyst decreases along the optimal line. At the outlet of the cold tube layer, the temperature of the catalyst decreases below the optimal line, and the catalyst is ready for the adiabatic reaction in the next stage.

The synthetic reactor of the present invention consists substantially of a housing P, a catalyst basket R and an heat exchanger E. The housing P can withstand pressure, the reaction pressure therein is typically 14–32 MPa. The catalyst basket R consists of a cover plate H, a cylinder S and a catalyst supporting grid J, the catalyst in the basket is supported on the supporting grid J at the bottom of the basket R. The catalyst layer consists of a cold tube catalyst layer K1 having therein counter-flow cold-tube bunch Cb and an adiabatic catalyst layer K2. The cold tube bunch Cb consists substantially of an inlet tube a, the cold tubes b and a ring tube d1 connecting the inlet tube a and the cold tubes b. The cold tube bunch Cb may also consist of an inlet tube a, cold tubes b, an outlet tube c, a ring tube d1 connecting the inlet tube a and the cold tubes b, and a ring tube d2 connecting the cold tubes b and the outlet tube c. The cold tube catalyst layer K1 may have one or more cold tube bunch(es) Cb arranged concentrically, each bunch has a plurality of cold tubes b arranged concentrically at circles of different radii, and a central tube I connecting the heat exchanger E is located at the center of the catalyst layer. The feed gas enters the reactor from the inlet tube a, and is distributed to the plurality of cold tubes through the ring tube d1. The feed gas stream 2 in the tubes is heated by the high temperature reaction gases outside the tubes counter flowing in the catalyst layer K1. The heated stream either exits from the cold tubes b directly or exits through the ring tube d2 and the outlet tube c. The exit stream 2 is then mixed with stream 1, which has been heated in the heat exchanger and exited from the central tube I. The temperature of the mixture is elevated to a temperature above the active temperature of the catalyst. And the gas stream enters successively into the cold tube catalyst layer K1 and the adiabatic catalyst layer K2. In cold tube catalyst layer K1 the gases react and exchange heat with gas stream in the cold tubes b in a counter flowing manner, and the gases react adiabatically in the adiabatic catalyst layer K2. The ratio of the temperature of the gas stream 2 exiting the cold tubes to the temperature of the mixed gases entering the cold tube catalyst layer is 0.75–1.25. The amount of the catalyst in the cold tube catalyst layer is 15–80% by weight, preferably 30–50% by weight of the total amount of the catalyst, depending on the reaction conditions. The gas in the cold tube catalyst layer K1 and the adiabatic catalyst layer K2 may both flow in the axial direction; or the gas may first flow axially in the cold tube catalyst layer K1, and then flow radially and axially in the adiabatic catatyst layer K2; or flow counter-currently in the adiabatic catatyst layer K2. The cold tubes b may be round or flattened ones. The ratio of the heat-conducting area of the cold tubes to the volume of the catalyst is 3–20 $M^2/M^3$.

DETAILED DESCRIPTION OF THE INVENTION

Figure 1:
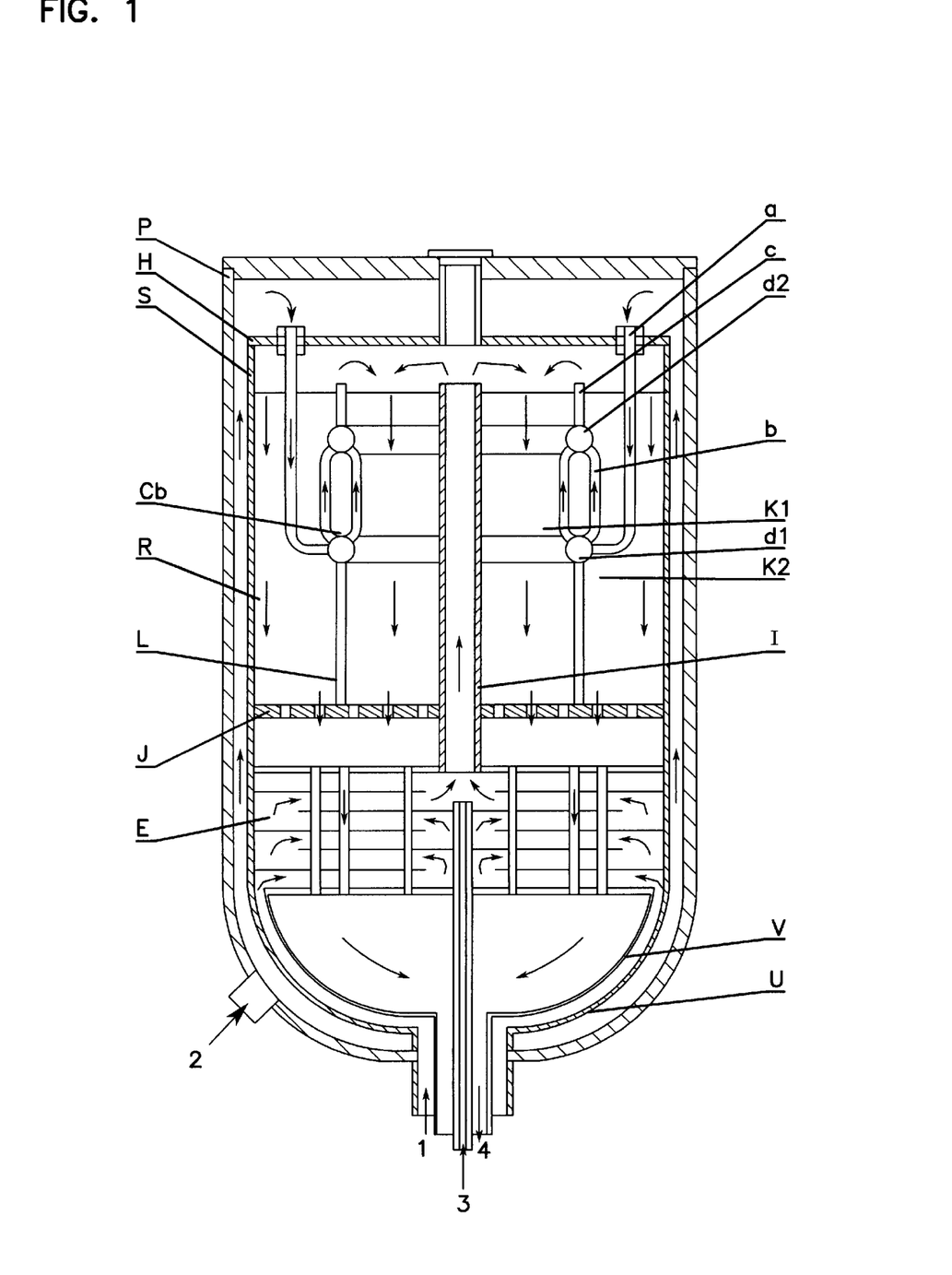
FIG. 1 is a schematic view of an embodiment of the reactor of the present invention, wherein the reactor consists of an axially flowing cold tube catalyst layer and an adiabatic catalyst layer.

Referring to FIG. 1, a reactor such as ammonia converter with moderate height-radius ratio is shown. An inner cylinder is provided inside the pressure-withstanding housing P, there is a ring-shaped space between the outer wall of the reactor and the wall S of the inner cylinder. Catalyst basket R is placed in the upper part of the inner cylinder, with the central tube I at the center thereof The catalyst is placed in the catalyst basket. The upper catalyst layer K1 is provided with a cold tube bunch Cb. Cold tube bunch Cb has a plurality of cold tubes arranged in 2–4 concentric circles, the tubes connect the lower ring tube d1 and the upper ring tube d2. The lower ring tube d1 connects to the inlet tube a, while the upper ring tube connects to the outlet tube c. The inlet tube a passes through the cover plate H of the catalyst basket, the gap between them being movably sealed with a stuffing box, or it may be connected with a corrugated pipe. Ring tube d2 is located at the space above the catalyst layer that has been reduced. The cold tube bunch is supported by the shelf L and held on the supporting grid J together with the catalyst, and it may expand and contract freely during operation. At the lower part of the inner cylinder, a tube-array type heat exchanger E is shown in the figure, but it can also be a spiral plate heat exchanger. The feed gas stream 1 and stream 2 are separated by the cylinder body and the bottom sealing-head U, while the feed gas stream 1 and the outlet gas stream 4 are separated by the bottom plate V of the heat exchanger. When the catalyst is heated for reduction, cold gas enters into the reactor through the space between the bottom sealing-head U and the bottom plate V of the heat exchanger, and flows into the heat exchanger E to exchange heat with the hot gas exiting from the catalyst layer, then it is further heated by an electric heater in the central tube I, finally it enters the catalyst layer to reduce it by heating. In normal operation, the feed gas is divided into two streams, i.e. stream 1 and stream 2. Stream 1 passes through heat exchanger E and exchanges heat with the reactant gases, then exits from the central tube I. Stream 2 enters the converter through the ring-shaped spacing between the housing P and the inner cylinder, then enters the cold tube bunch Cb via the inlet tube a. Stream 2 is then distributed uniformly into each cold tube in the bunch by the lower ring tube d1, each branch stream flows upward in the cold tubes and is heated by exchanging heat with the counter-flowing reactant gases outside of the tubes, the branch streams are then combined in the upper ring tube d2 and exit from outlet tube c, finally, the stream exiting from the outlet is combined with feed gas stream 1 from the central tube I. For the synthesis of ammonia, for example, mixed gases in the temperature range of 350–430° C. first perform reaction over the catalyst in the cold tube catalyst layer K1, the concentration of the product is raised through the reaction, and the temperature of the gases is raised by the heat released from the reaction, said reactant gases also exchange heat with the counter-flowing cold gas in the cold tubes, so that the temperature thereof increases to the hot-point temperature of 450–510° C. and then decreases to 380–430° C. The reactant gases then react in the adiabatic catalyst layer K2, the temperature thereof is raised again to approximately 460° C., and the concentration of the product is further increased, for the synthesis of ammonia, for example, to 15–20 mol %. Reactant gases in said cold tube catalyst layer K1 and said adiabatic catalyst layer K2 are both flowing axially, the reactant gases exiting from the catalyst layer enter heat exchanger E and exchange heat with the inlet stream 1, then exit from the reactor as stream 4. Stream 3 in the figure is a gas stream from the auxiliary line for adjusting the inlet temperature of the catalyst bed.

Figure 2:
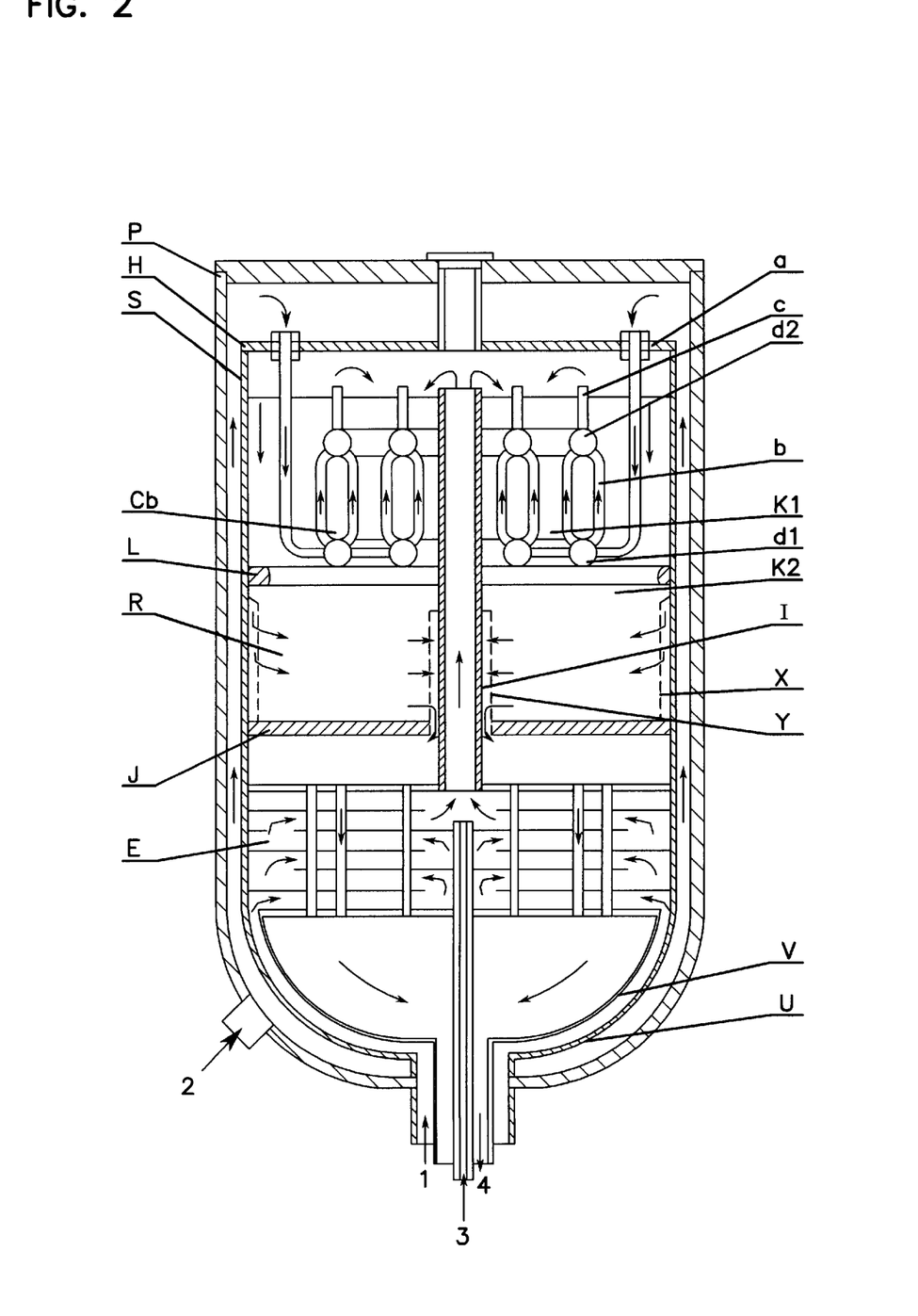
FIG. 2 and FIG. 3 are schematic views of the reactor of the present invention, wherein the reactor consists of an axially flowing cold tube catalyst layer and a radially flowing adiabatic catalyst layer.

Referring to FIG. 2, a reactor with a larger height-radius ratio is shown. The reactant gases in the cold tube catalyst layer are again flowing axially, the difference with the reactor in FIG. 1 is that a radially flowing adiabatic catalyst layer is located at the lower part of the catalyst basket R, and the catalyst supporting plate J of the basket has no perforation for the gas to pass through. Instead, there is an outer distributing cylinder X at the inner side of the body S of the basket body, and there is an inner distributing cylinder Y at the outer side of the central tube I, both distributing cylinders have a multiplicity of perforations thereon. Most part of the reactant gases that have passed through the cold tube catalyst layer K1 first enters the ring-shaped spacing between the outer distributing cylinder X and the basket wall S, then passes through the outer cylinder X into adiabatic layer K2 and flows radially inward and perform reaction, finally passes through the inner distributing cylinder Y into the ring-shaped spacing between the inner cylinder Y and the central tube I. The reactant gases flowing into said spacing are combined with the axially flowing minor part of the reactant gases that enters therein, the combined gases then enters the heat exchanger E and exchange heat with the feed gas stream 1 in the tube array type heat exchanger, finally the reactant gases exit the reactor as stream 4. There are two cold tube bunches in FIG. 2, hanged on the basket wall S by the supporting shelf L. Other notations of the reactor and the reference numerals in FIG. 2 are the same as those in FIG. 1. Of course, the gas in the lower adiabatic layer may be designed to flow radially outward, wire screens may be provided for the distributing cylinders, and other component parts well known in the art, such as strengthening supporters, separators and nozzles, although not shown in the figure, may be included in the reactor.

Figure 3:
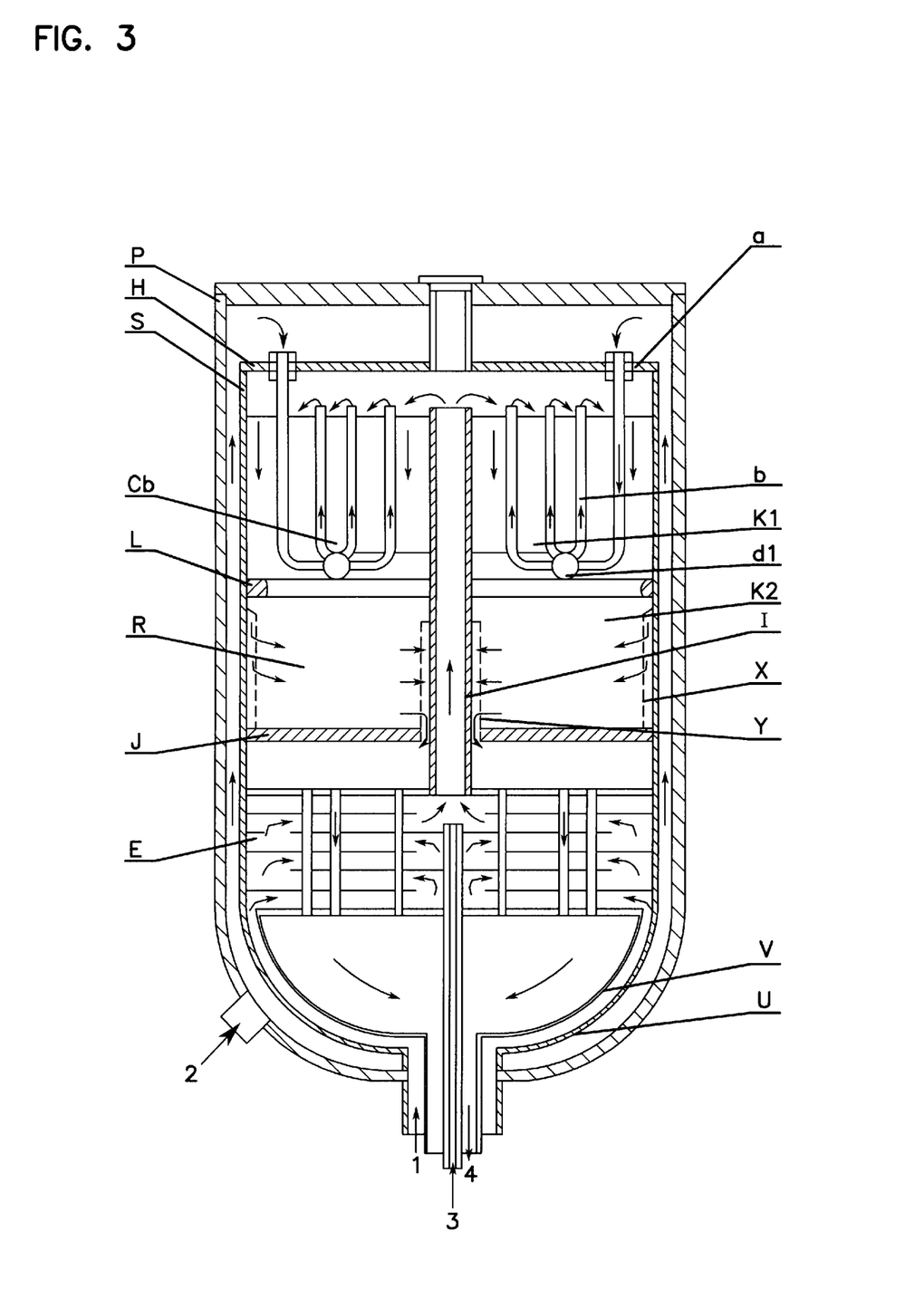

FIG. 3 shows a reactor in which the manner of reaction and heat exchange flowing is the same as those in FIG. 2, the difference with the reactor in FIG. 2 is that the cold tube bunch consists substantially of an inlet tube a, cold tubes b, and a ring tube d1 connecting the inlet tube a and cold tubes b. The cold tubes b extend outside of the catalyst layer, allowing the gases in the tubes to exit directly. So this kind of reactor has a simple structure, and is easy to be fabricated. However, the structure of FIG. 2, wherein the cold tubes are connected to the outlet tube c via the ring tube d2, facilitates the installation of the system as well as the pressure test and leak detection thereof. Other notations in FIG. 3 and the reference numerals therein are the same as those in FIG. 2.

Figure 4:
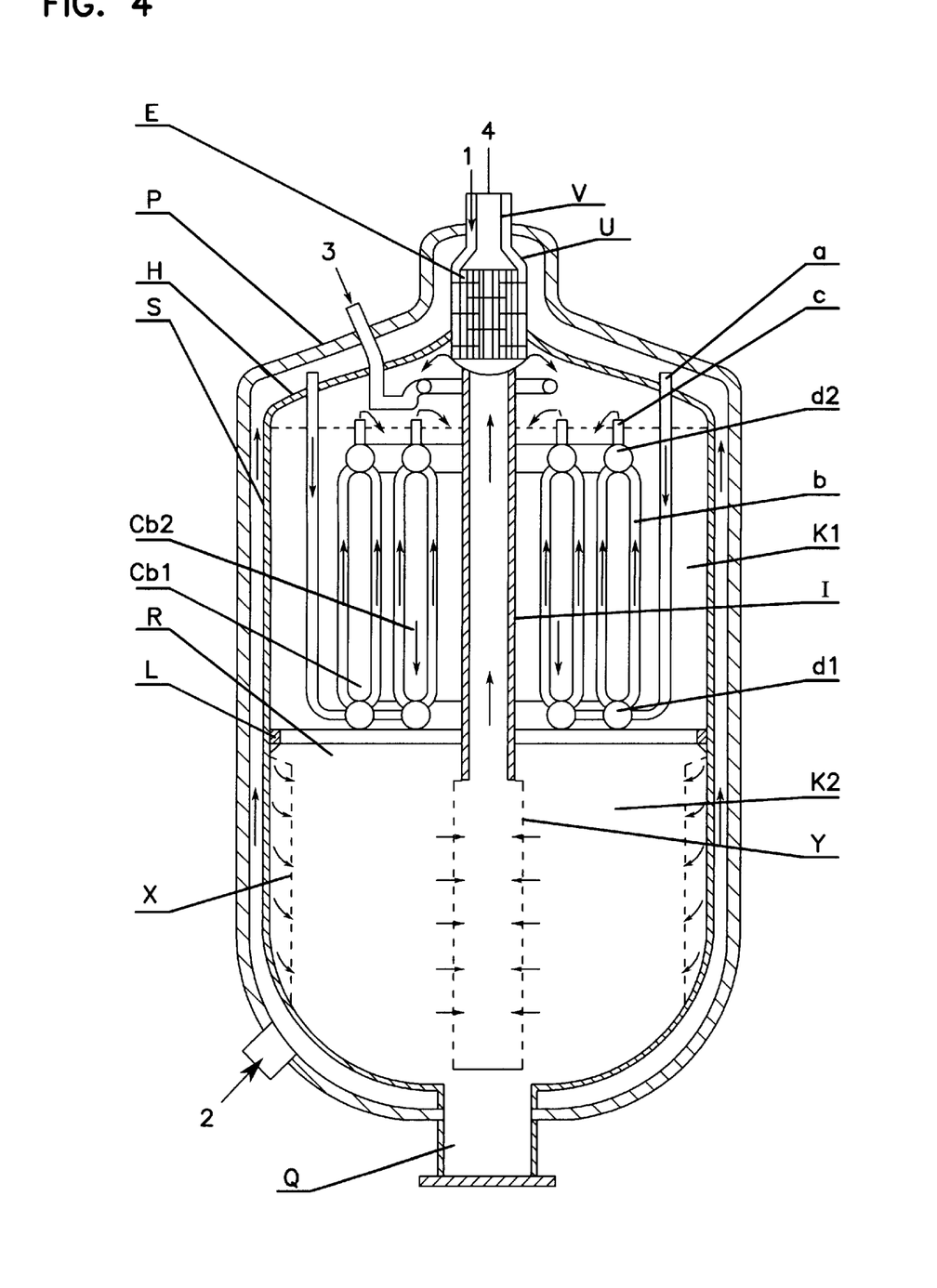
FIG. 4 is a schematic view of a reactor of the present invention having an axially flowing cold tube catalyst layer and a radially flowing adiabatic catalyst layer, the reactor may be used for the modification of existing large scale ammonia converters.

FIG. 4 shows a reactor for the modification of existing large scale ammonia plants, for example, a large scale Kellogg bottle type ammonia converter may be modified by this type of reactor. As in FIG. 2, the upper part of the catalyst layer in FIG. 4 is a cold tube layer K1 where the reactant gases flow axially. There are a plurality of cold tube bunches Cb1, Cb2, etc., coaxially arranged in the cold tube layer, although only two are shown in the figure. Each cold tube bunch consists of an inlet tube a, an outlet tube c, cold tubes b, ring tube d1, and ring tube d2. The inlet tube may connect to a section of corrugated pipe when it passes through the cover plate H of the inner cylinder. The lower part of the catalyst layer is an adiabatic catalyst layer K2 wherein the reactant gases flow both axially and radially. Heat exchanger E is installed at the upper part of the reactor, the catalyst may be released through the bottom hole Q when its cover is opened. Feed stream 2 enters the converter from the bottom, passes through the ring-shaped spacing between the outer housing P and the inner cylinder to the top of the converter, and then enters into the cold tube bunch. Feed stream 1 enters into the shell side of the heat exchanger E through the space between the sealing head U and the sealing head V of the heat exchanger. After exchanging heat with the reactant gases 4 in the tube side of the heat exchanger, stream 1 passes out of the heat exchanger, and combines with the heated stream 2 exiting from cold tube bunch Cb. The combined gas stream first perform reaction in the cold tube catalyst layer K1 and exchanges heat with the counter flowing gas in the cold tubes b. The gas exiting from the cold tube layer, apart from a small portion that flows axially, enters into the adiabatic layer through the outer distributing cylinder X and performs reaction while flowing radially. The reactant gases then collect in the interior of the inner distributing cylinder Y, and flow into the tube side of heat exchanger E at the upper part of the converter via the central tube I, after exchanging heat with the feed stream 1, the reactant gases exit out of the converter as stream 4. Stream 3 in the figure is a cold feed stream for adjusting the inlet temperature of the catalyst layer. The resistance in the axial-radial reactor is lower than that of the axially flowing reactor, so the operating space velocity, i.e. the ratio of the total amount of the gas entering the converter to the volume of the catalyst, may have a larger value.

Figure 5:
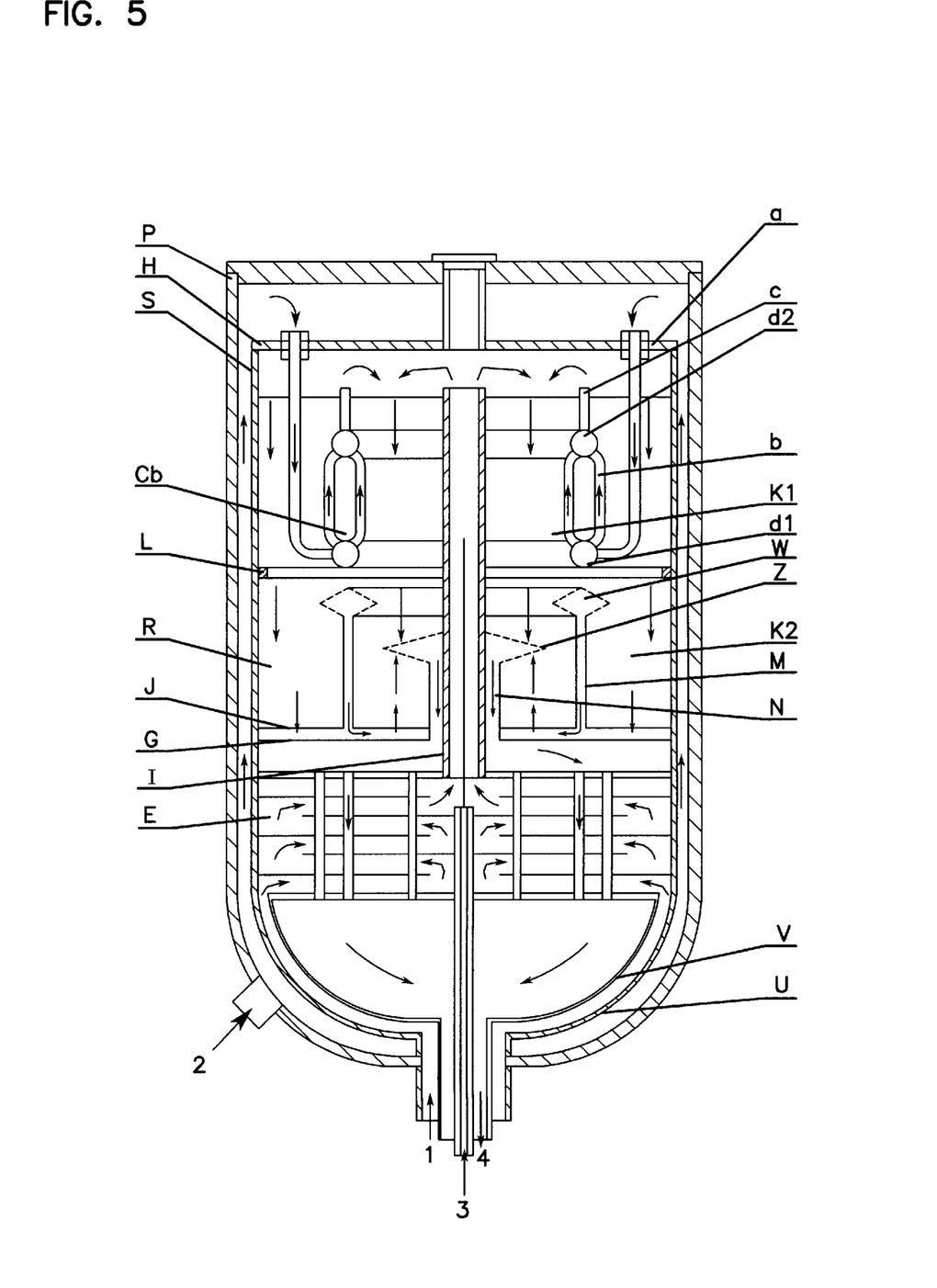
FIG. 5 is a schematic view of a reactor of the present invention, wherein the reactor consists of an axially flowing cold tube catalyst layer and a convective adiabatic catalyst layer.

FIG. 5 shows another type of the reactor of the present invention. There is a cold tube catalyst layer K1 wherein the reactant gases flow axially at the upper part of the catalyst layer K1. Counter flow cold tube bunch Cb is hanged on the wall S of the inner cylinder by a supporting shelf L. There is a gas-collecting chamber W adjacent immediately to the lower end of the cold tube bunch Cb, chamber W is provided with a tube M connecting the grid J at the bottom of the catalyst basket. And a gas-collecting chamber Z is provided at the center part of the adiabatic catalyst layer K2, there are many small holes that allow gas but not catalyst to pass on the walls of the gas-collecting chambers W and Z. Gas collecting chamber Z is connected to heat exchanger E by a sleeve tube N. The heat exchanger shown in the figure is a tube array type heat exchanger. There is a separating plate G between the perforated grid J of the catalyst basket and the heat exchanger E. After being heated in the heat exchanger E, feed stream 1 combines with feed stream 2, which has been heated by passing through the cold tube bunch. The combined gases first react in the cold tube catalyst layer K1 at the upper part of the reactor and exchange heat with the counter flowing gas in the cold tubes b. One half of the gas exiting the cold tube layer continues to flow downward in the upper part of the catalyst layer K2. The other half of the gas enters the gas-collecting chamber W and passes through the tube M to the space under the grid J of the catalyst basket, then flows upward and reacts at the lower part of the adiabatic catalyst layer K2. These two parts of the reactant gases flow counter-currently to the center part of the catalyst layer, combine in the gas-collecting chamber Z, and pass through the ring-shaped spacing between the sleeve tube N and the central tube I downward to the space under the separating plate G. After passing through the tube side of the heat exchanger E and exchanging heat with the incoming feed stream 1, the reactant gases exit the reactor as stream 4. The stream 3 entering the reactor at the bottom is from an auxiliary line for adjusting the temperature of the catalyst layer.

Figure 6:
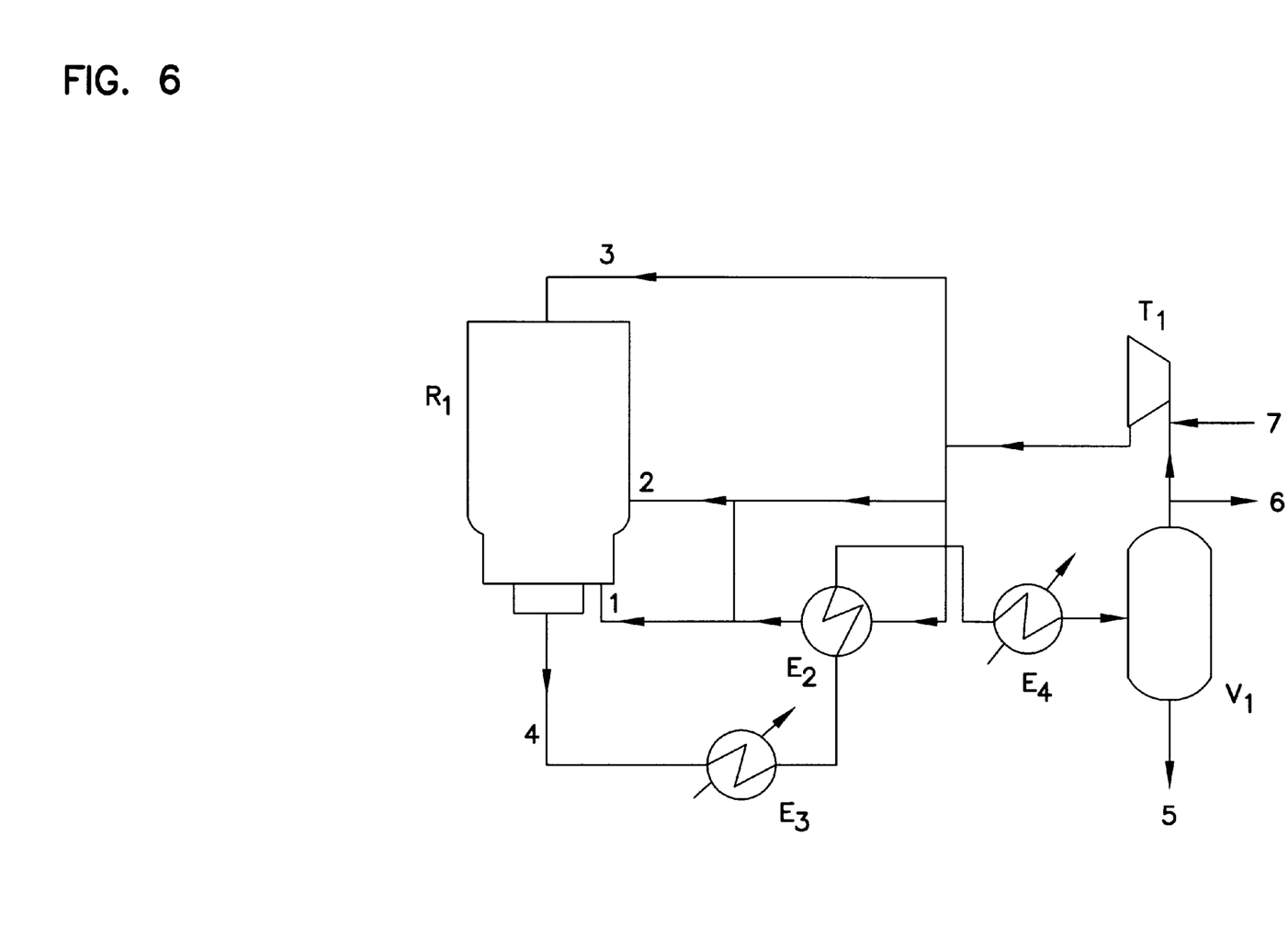
FIG. 6 is a diagram showing the connection of the facilities outside of the reactor.

FIG. 6 is a connection diagram of the facilities outside of the reactor. In the diagram, R1 is the reactor, the structure of which may be seen in FIGS. 1–5; E2 is a heat exchanger for the cold and hot gas outside the reactor; E3 is a by-product steam boiler; E4 is a cold condenser; V1 is a product separator, such as an ammonia separator; T1 is a recycle compressor. The feed gas delivered from the recycle compressor is divided into three streams. Among them, stream 1, after being heated in the heat exchanger E2 outside of the reactor, enters the heat exchanger in the reactor to be further heated; stream 2 enters the cold tube bunch in the reactor to absorb the reaction heat in the cold tube catalyst layer. The flow rates of streams 1 and 2 can be adjusted, the stream 2 entering the cold tube bunch typically includes about 30–70% of the total amount of the gas. The temperature of stream 2 can be adjusted by the ratio of the amount of the gas that has passed through the heat exchanger E2 to the amount of the gas that has not passed through heat exchanger E2, so as to vary the temperature of the catalyst layer in accordance with different periods of the operation of the catalyst. Stream 3 is an auxiliary line cold gas for adjusting the inlet temperature of the catalyst layer. Stream 4 is the stream exiting the reactor, after recovering the heat thereof in the boiler E3, it flows into heat exchanger E2 to heat the feed gas. Stream 5 in the figure is the separated product, such as liquid ammonia or methanol. Stream 6 is the vent gas. Stream 7 is the supplementary feed gas. In the figure, the recycle compressor is placed between the ammonia separator V1 and the heat exchanger E2, however, in large-scale ammonia plants, the recycle compressor is usually placed between heat exchanger E2 and heat exchanger E4.

The heat exchangers inside the reactor in FIGS. 1–5 may also be placed outside of the reactor. In this case, feed stream 1, after being heated by the heat exchanger E2 outside of the reactor, enters the reactor R1 and combines directly with the feed stream 2 heated in the cold tube bunch, and then passes into the catalyst layer to react. Stream 2 in the figure may also enter the reactor from the upper part of the outer cylinder, and flow through the ring-shaped spacing downward to the bottom (in this case, the inlet tube a of the cold tube bunch extends from the bottom upward). When the reactor uses a hot wall vessel and no outer cylinder is present, the inlet tube a may enter the reactor either from the bottom or from the middle.

Figure 7:
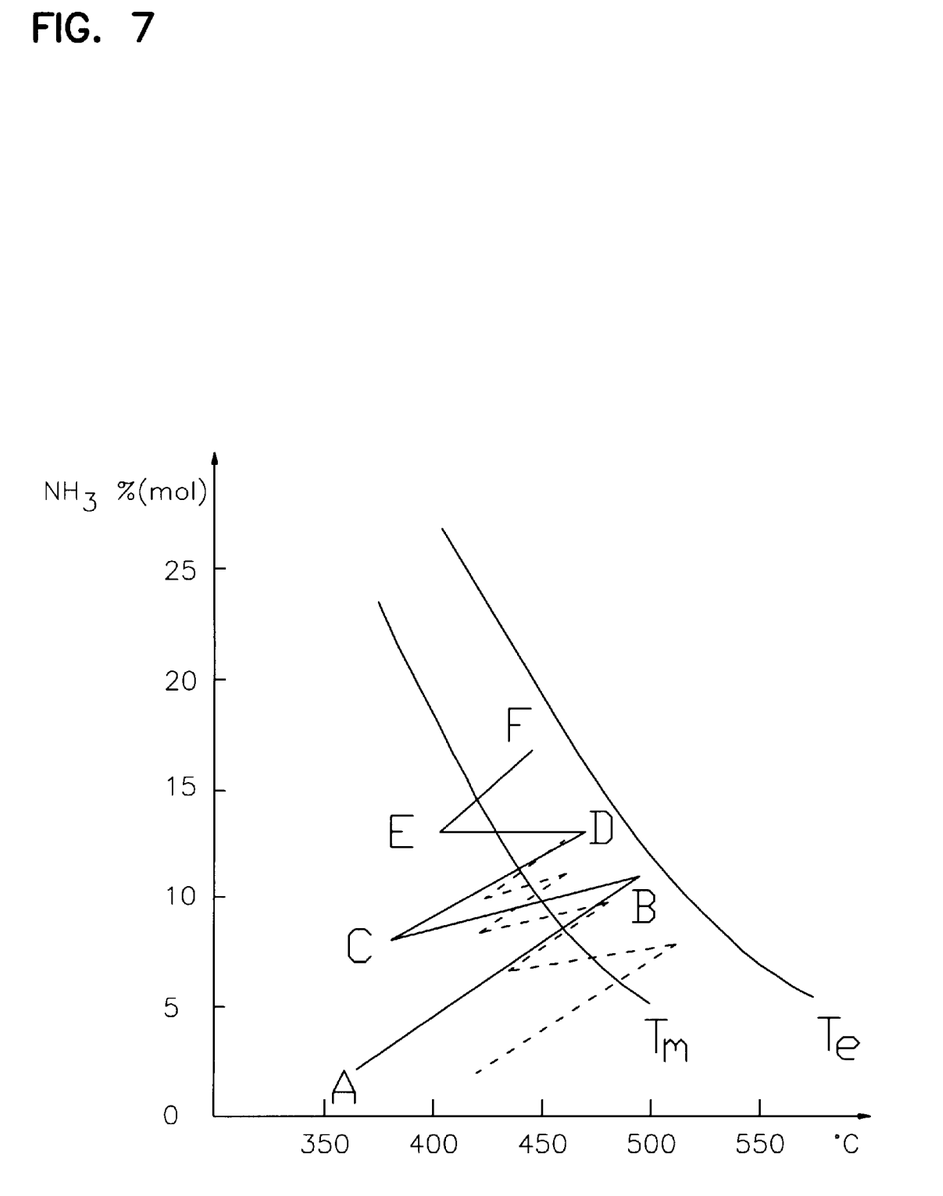
FIG. 7 and FIG. 8 are t-x diagrams of the reactor, wherein the abscissa t represents temperature in degree Celsius, and the ordinate x represents the concentration of ammonia in mol %.
Figure 8:
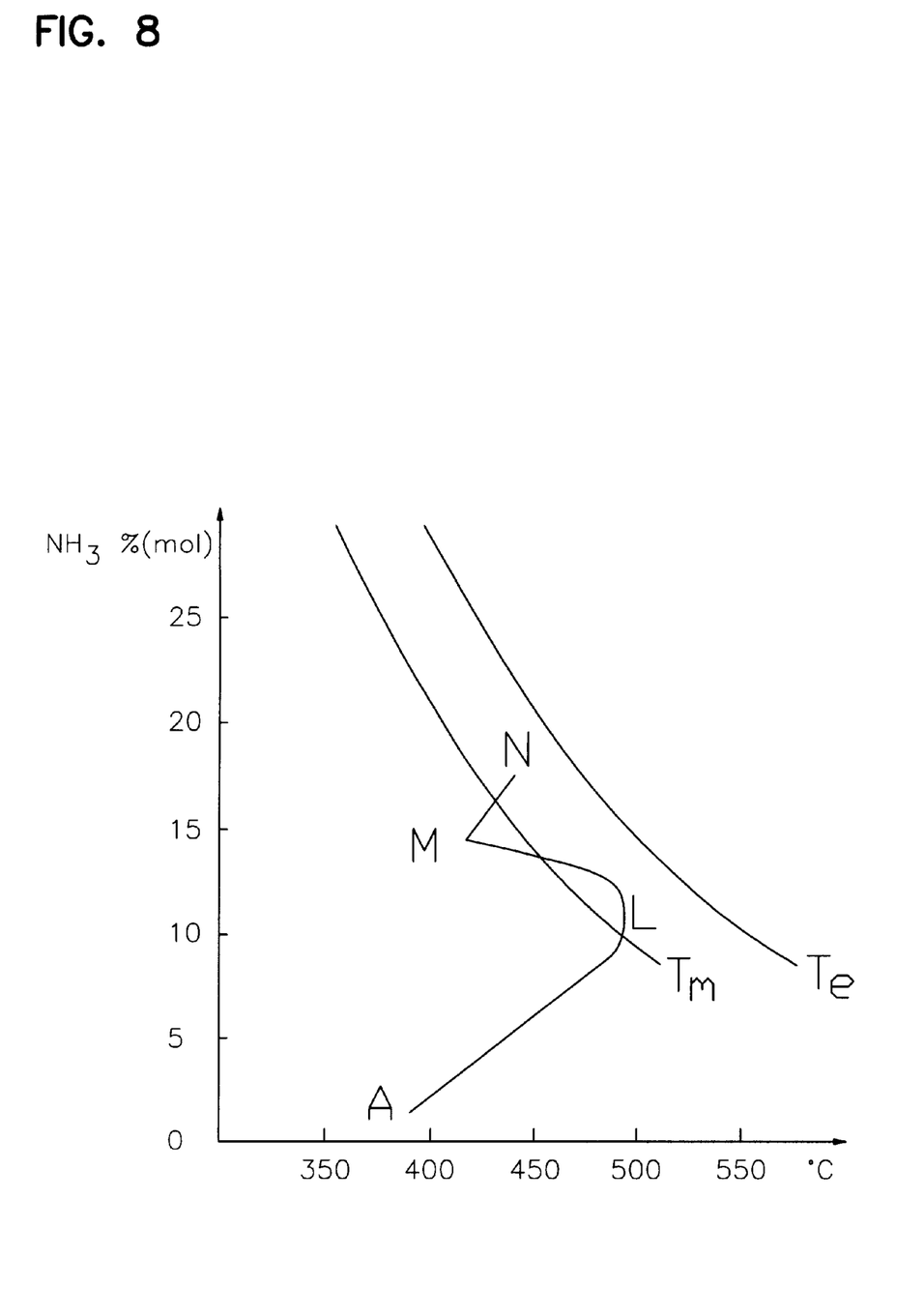

The present invention has the following advantages over the prior art:

1. The reactor has excellent process performance and high conversion efficiency. FIG. 7 is the curves showing the ammonia concentration in the reacted gases vs. the corresponding temperature during the process of synthesizing ammonia from hydrogen and nitrogen. Te is the equilibrium temperature curve for ammonia synthesis, Tm is the optimal temperature curve, both Te and Tm decrease with the increasing of the reactant concentration. The operation curve of the above-mentioned Casale reactor, which uses feed-gas-quench between the first and second stage and uses indirect heat exchange between the second and third stage, is shown in the figure as the solid curve ABCDEF. The operation curve of the above-mentioned Kellogg 4-bed layer ammonia synthesis reactor, which uses feed-gas-quench between any two stages, is shown in the figure as the dotted curve. As can be seen from the figure, when cold quenching gas is added, the temperature decreasing of the reactant gas is accompanied by the decreasing of the ammonia concentration. Most parts of the reaction in these two reactors are performed under conditions far from the optimal temperature curve Tm. The curve ALMN in FIG. 8 shows the operation of an ammonia synthesis reactor using the improved method of the present invention, since the reaction begins in the cold tube catalyst layer, as the reaction proceeds, part of the reaction heat is transferred out of the layer, so the hot point temperature L corresponding to the same ammonia concentration is lower than the point B of the adiabatic operation curve mentioned above, this is advantageous for preventing the catalyst from deactivation by overheating. And since heat exchange is effected in a counter flowing manner, in the reaction performed continuously after passing the hot point, the heat transferred to the cold gas is more than the reaction heat produced, so the reaction temperature decreases along the optimal line, until it reaches the point M corresponding to the exit of the cold tube layer, this decreasing of the temperature prepares the condition for further reaction in the adiabatic layer. And since the stream 2 entering the cold tube bunch is separated from the stream 1 passing through the heat exchanger, their proportion may be adjusted, the inlet temperature of stream 2 may be varied in the range of 30–190° C., thus facilitate the control of temperatures at other points in the catalyst layer. For example, in the early stage of using the catalyst, in order to prevent the hot point temperature from becoming too high, the temperature of stream 2 may be reduced, so that the temperature of the gas exiting from the cold tubes is lower than that of the mixed gas entering the cold tube catalyst layer. The reaction product concentration and temperature at the exit of the adiabatic reaction reach the condition N. It can be seen from the figure that the operation curve of the reactor comprising of a counter-flowing cold tube catalyst layer and an adiabatic layer is closer to the optimal temperature line Tm, so the conversion efficiency of the present reactor is higher than that of the prior art, and a high production rate can be obtained, the content of ammonia in the outlet gas is raised from 12–14 mol % to 15–20 mol %.

2. The structure of the reactor is simple and reliable, it is easy to install and operate. Many of the existing reactors have three or more catalyst beds, the beds are separated or heat exchangers are installed between the beds, their structure is complicated. The reactor of the present invention has a single catalyst bed layer, the bed layer consists of a cold tube layer and an adiabatic layer that are connected together and are not separated, so the amount of catalyst contained in it can be significantly increased, and the catalyst can be put in and taken out conveniently. For each cold tube bunch, only the inlet tube a passes through the cover plate of the catalyst basket, the gap between the inlet tube and the cover plate can be sealed by a stuffing box, or a corrugated pipe can be used to connect the inlet. There are typically two inlet tubes located symmetrically to the center, so the number of gaps to be sealed is reduced, and the structure is simple and reliable. For reactors with a large radius, any one of the axial, radial, axial-radial and counter-current flowing modes can be adopted, so that the resistance can be efficiently reduced, and power can be conserved.

EMBODIMENT EXAMPLE

An embodiment example is given below in connection with the reactor in FIG. 4.

A 1000 ton/day ammonia converter is selected, the inner radius of the exterior cylinder is 2.87 M, total height 25 M, synthesis pressure 24 MPa. The internals thereof are modified by using the present invention, the total amount of catalyst is 58 $M^3$. Ammonia catalyst of $\Phi$ 4.7–6.7 mm is used in the upper axial counter flowing cold tube layer, its total amount therein is 20 $M^3$. Ammonia catalyst of $\Phi$ 1.5–3 mm is used in the lower radial flowing adiabatic layer, its total amount therein is 38 $M^3$. Stream 1 has a flow rate of 261,000 $NM^3/h$, it enters the heat exchanger to be heated. Stream 2 has a flow rate of 319,000 $NM^3/h$, it flows into the cold tube bunch to be heated. Stream 1 and stream 2 are then combined, the temperature of the combined gas being 390° C., the combined gas enters the cold tube layer to synthesize ammonia, the hot point being 492° C., the gas exiting the cold tube layer at a temperature of 415° C., the content of ammonia in the reacted gases is raised from 1.78 mol % to 15.2 mol %. Then it enters the radially flowing adiabatic layer to further synthesize into ammonia, the temperature of stream 4 exiting the adiabatic layer is 448° C., the content of ammonia is 19.5 mol %. Total amount of the feed gas entering the converter is 580,000 $NM^3/h$, and total amount of the gas exiting from the converter is 493,974 $NM^3/h$, the situations are shown in the operation curve ALMN in FIG. 8. The exiting gas passes through the heat exchanger in the converter to exchange heat with stream 1, then flows to the boiler to recover the heat contained in it. The pressure drop of the reactor is 0.2 MPa. The composition of the inlet and outlet gases are as follows:

|  | Inlet (mol %) | Outlet (mol %) |
|---|---|---|
| $H_2$ | 65.83 | 51.27 |
| $N_2$ | 21.94 | 17.06 |
| $CH_4$ | 7.39 | 8.68 |
| Ar | 3.06 | 3.59 |
| $николаNH_3$ | 1.78 | 19.50 |

As shown in the data, the throughput of the modified reactor is as high as 1567 ton/day, 56% higher than that of the prior art, and the net gain of ammonia is increased from 11.1% (prior art) to 17.72% (the present invention).

What is claimed is:

1. A method for performing reversible exothermic gas-solid phase catalytic reactions, the method comprising:
   compressing a gas feed to a predetermined pressure, raising the temperature of said gas feed to the active temperature of a reacting catalyst by heat-exchanging, and subjecting said gas feed to exothermic reaction in a catalyst layer, wherein said gas feed is divided substantially into two streams, stream (1) and stream (2), said stream (1) is heated by heat exchanging with the reacted gas exited from a lower adiabatic catalyst layer (k2) of the catalyst layer, said stream (2) enters cold tubes in a cold tube catalyst layer (k1), which is above the catalyst layer (k2), of the catalyst layer and is heated by counter flowing reaction gas around the cold tubes, the heated streams (1) and (2) are mixed and fed into the cold tube catalyst layer (k1) to perform reaction and exchange heat with the stream (2) counter flowed in the cold tubes, and then enters the adiabatic catalyst layer (2) to perform adiabatic reaction.

2. A synthetic reactor for utilizing the method as described in claim 1, comprising an exterior housing (P), a catalyst basket (R) and a heat-exchanger (E) under the catalyst basket (R), said catalyst basket (R) having a cover plate (H), a basket body (S) and a grid (J) at the bottom for supporting a catalyst layer in the basket, wherein said catalyst layer comprises a cold-tube catalyst layer (K1) and a adiabatic catalyst layer (K2) thereunder, said layer (K1) contains therein one or more counter flow cold tube bunch(es) (Cb), each one of which comprises an inlet tube (a), cold tubes (b) and a ring tube (d1) connecting said tube (a) and said tubes (b), or each one of which comprises inlet tube (a), cold tubes (b), outlet tube (c), ring tube (d1) connecting said tube (a) and said tubes (b), and ring tube (d2) connecting said tubes (b) and said tube (c).

3. The reactor as described in claim 2, wherein there is an outer (X) and an inner (Y) distributing cylinder in the adiabatic catalyst layer (K2), each having a multiplicity of holes therein.

4. The reactor as described in claim 2, wherein gas collecting chambers (W) and (Z) are provided in the adiabatic catalyst layer (K2), with tubes (M) connecting said grid (J) at the bottom of the catalyst basket and the gas collecting chamber (W) at the upper part of the adiabatic catalyst layer (K2), and tube (N) connecting the heat exchanger (E) and the gas collecting chamber (Z) at the middle part of the adiabatic catalyst layer (K2).

5. The reactor as described in claim 2, wherein one or more cold tube bunches (Cb) are coaxially installed in the cold tube catalyst layer (K1) in the catalyst basket (R), each cold tube bunch has a plurality of cold tubes arranged in circles of different radii, such that each tube is arranged perpendicular to the plane of a circle and is distributed on the circumference of a circle.

6. The reactor as described in claim 2, wherein said cold tubes (b) are round single tubes.

7. The reactor as described in claim 2, wherein said cold tubes (b) are flattened tubes.

8. The method as described in claim 1, wherein the predetermined pressure is between 14 MPa and 32 MPa.

* * * * *